June 24, 1952

F. J. HAMMES 2,601,517

SYNCHRONOUS MOTOR

Filed Nov. 1, 1949

INVENTOR.
FREDERIC J. HAMMES
BY

ATTORNEYS.

June 24, 1952          F. J. HAMMES            2,601,517
                       SYNCHRONOUS MOTOR
Filed Nov. 1, 1949                          3 Sheets-Sheet 2

INVENTOR.
FREDERIC J. HAMMES
BY
ATTORNEYS.

June 24, 1952        F. J. HAMMES        2,601,517
SYNCHRONOUS MOTOR

Filed Nov. 1, 1949        3 Sheets-Sheet 3

*INVENTOR.*
FREDERIC J. HAMMES
BY
*Busser & Harding*

ATTORNEYS.

Patented June 24, 1952

2,601,517

UNITED STATES PATENT OFFICE 2,601,517

SYNCHRONOUS MOTOR

Frederic J. Hammes, Birdsboro, Pa., assignor of eleven-twentieths to Dorothy C. Hammes, Reading, Pa., one-fourth to John A. Stinson, Hatboro, Pa., and one-fifth to Frederic J. Hammes, trustee Application November 1, 1949, Serial No. 124,757

7 Claims. (Cl. 172—278)

This invention relates to an electric motor and more particularly to a permanent magnet rotor type of single phase synchronous motor which is self-starting. This application is, in part, a continuation of my prior application Serial No. 651,634, filed March 2, 1946, now abandoned.

Various types of permanent magnet rotor electric machines are old in the art. These machines are variously used as magnetos, generators or motors. The present invention, however, includes various structural features lending particular advantage to synchronous motor operation.

It is an object of this invention to provide a permanent magnet type motor rotor having improved magnetic field strength and uniformity over those permanent magnet type rotors known in the prior art.

It is a further object of this invention to provide a magnetic rotor type self-starting synchronous motor having eccentric rotor and stator surfaces and having starting and running characteristics greatly improved over those obtained by self-starting permanent magnet rotor machines known heretofore.

These and other objects of the invention will become apparent from the following description read in conjunction with the accompanying drawings in which.

Figure 1:
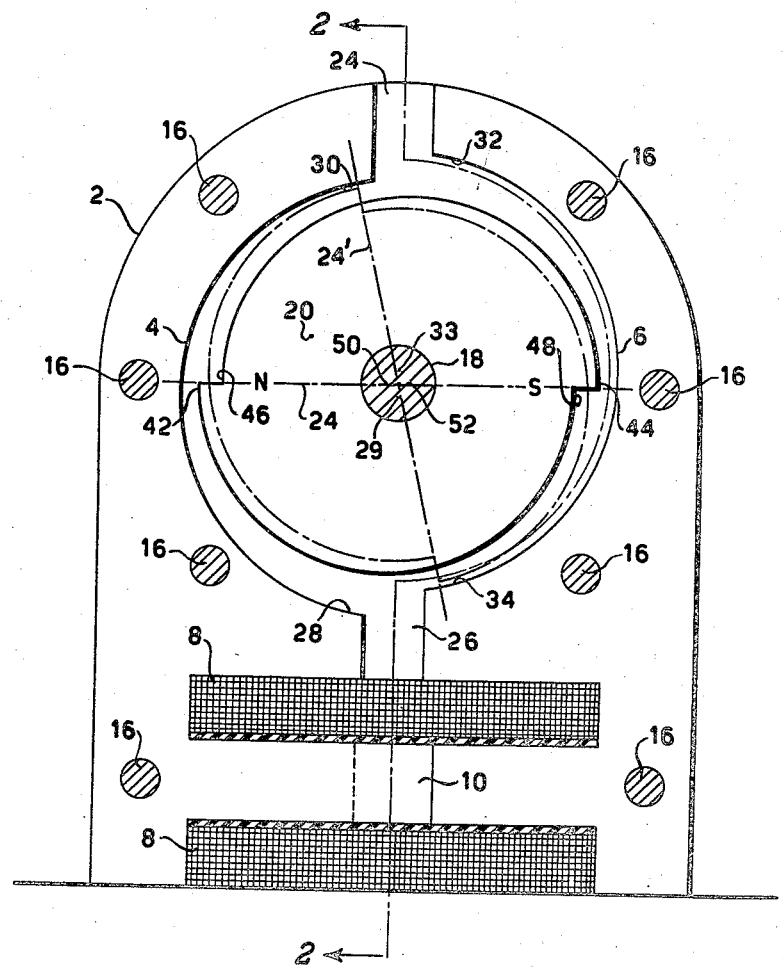
Figure 1 is a transverse sectional view, taken on the plane indicated by the line 1—1 in Figure 2, of a motor incorporating in preferable form the various features of the present invention.
Figure 2:
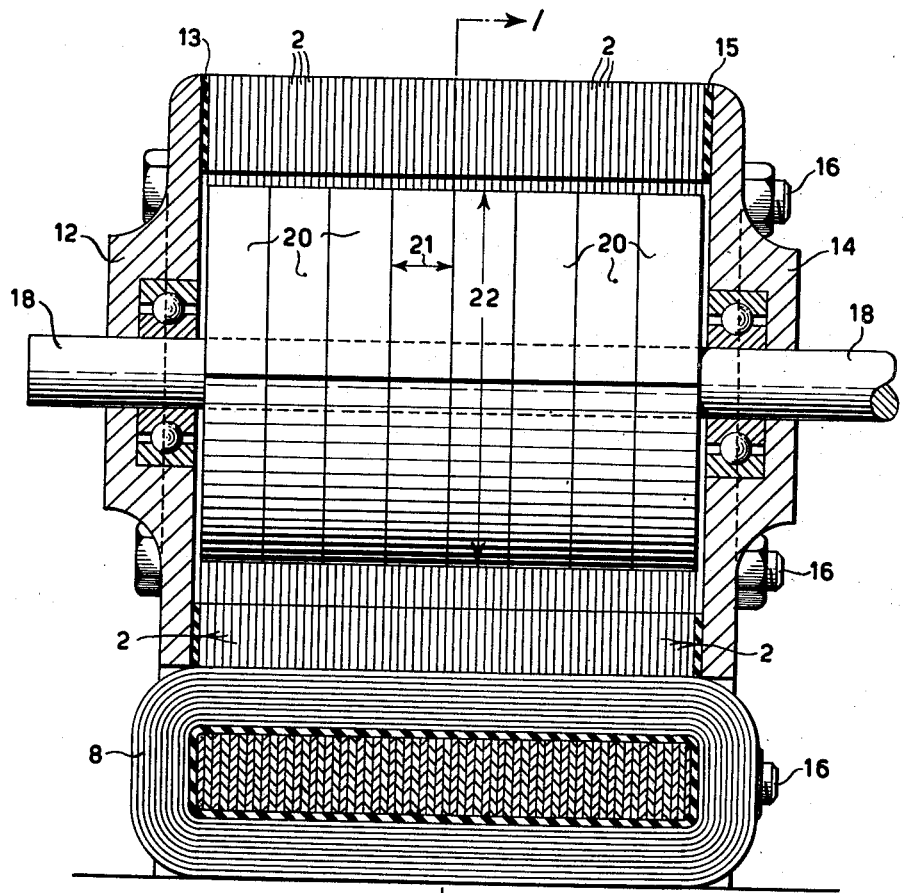
Figure 2 is an axial section of the motor, taken on the plane indicated by the line 2—2 of Figure 1.

Referring to Figures 1 and 2, there is shown a motor comprising a stator portion 2. The stator is formed of a plurality of soft iron laminations such as are conventional to motor field construction. The laminations are shaped to provide the two pole pieces 4 and 6. The lower portions of the laminations are cut away to provide for the mounting of the field coil 8. Alternate laminations overlap in the conventional fashion at 10 permitting assembly of the laminations within the coil 8 and providing for a generally continuous conductance of the magnetic field through laminations within the field coil.

The laminations are supported between the end plate members 12 and 14 by means of the longitudinal bolts 16. The end plate members are preferably made of non-magnetic material, such as brass, or a suitable aluminum alloy to reduce to a minimum the stray field losses and to avoid conductance of the magnetic field across the ends of the field poles. To further reduce the stray field losses insulating members 13 and 15 may be employed between the end plate members and the field laminations. Mounted within the end plate members 12 and 14 is the rotor shaft 18. The rotor shaft is also preferably made of non-magnetic material.

The rotor is composed of a stack of permanent magnet members 20 abutting one another and mounted on the non-magnetic rotor shaft 18. These permanent magnet members are preferably formed of one of several alloys which may be magnetized to great magnetic strength and which have excellent magnetic retentivity. These materials are well known in the form of, for example, alloys of aluminum, nickel and cobalt. The utilization of such magnet materials in electrical machines in general, and in motor rotors in particular, is not new. However, I have found that, by employing a laminated rotor structure comprising a number of magnetic elements with their polar axes 24 in parallel alignment and having their width 21 longitudinally along the rotor axis being approximately equal to ⅕ of their diameter 22, there is obtained a permanent magnet rotor having far greater effective magnetic strength and uniformity than a rotor composed of a single solid cylinder block of magnetic material.

The ratio of 1 to 5 of rotor magnet disc width to diameter is only cited as a practical example. Actually, the more narrow the magnet disc are made the greater will be the benefits achieved. The important consideration is that these highly magnetic materials which are difficult to cast or to work in small thicknesses can be made with economic practicality in sizes which will greatly improve motor operation and efficiency.

A solid magnetic rotor of these general proportions displays a considerably reduced field strength adjacent the end portions thereof compared to the field strength displayed in the area generally centrally thereof, whereas a rotor of the same diameter constructed of identical material but laminated in form as disclosed herein displays a relatively uniform field strength throughout its length, the maximum intensity of which is approximately 2.05 times greater than the maximum intensity of the field strength displayed by the solid cylindrical rotor.

Figure 3:
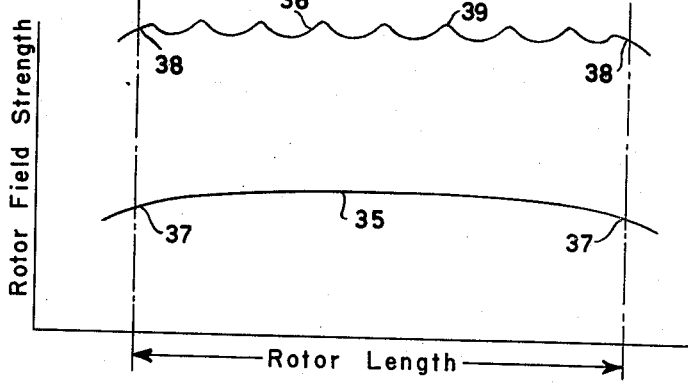
Figure 3 is a graph showing the field strength and field strength uniformity inherent in various types of permanent magnet rotor structures.

The curves 35 and 36 of the graph of Figure 3 show more clearly the relation between the field strengths adjacent to the polar surface of the two types of rotors. In the graph the abscissa is representative of the length of the rotor, and the ordinate representative of the field strength a fixed distance from the polar surface of the rotor. The end portions 37 of the curve 35 show clearly that the field strength of the solid rotor falls off considerably in the vicinity of its end portions due to the spreading of the lines of force. As a result of this there is a reduction in field strength in the vicinity of the center of the magnet due to the fact that the lines of force in the center area will be permitted to spread as a result of the falling off of the field at the end zone of the magnet.

Contrasted to this the field strength of the laminated rotor as shown by the curve 36 is not only more uniform over the entire length of the rotor, falling off only slightly at the ends thereof as shown by the end portions 38 of the curve, but also of greater maximum value. When a succession of magnet members are placed in adjacent positions such as in applicant's rotor with like poles being adjacent to each other the magnetic fields emanating from each pole tend to repel each other. Therefore, instead of tending to drain off at the edges of a disc in the case of a solid magnetic rotor, the magnetic field of each disc is concentrated or piled up into a higher peak 39 at its center than would occur if the magnet member existed alone.

The laminated rotor construction results in a greatly increased maximum value of field strength of the laminated rotor as a whole as compared with the solid rotor. The only elements which may experience end drainage in a laminated rotor are, of course, the elements at the end of the rotor. However, the fact that each disc is of comparatively narrow width reduces this loss to an extremely small proportion in comparison with a loss experienced in the solid magnet rotor. Thus advantage is gained in both field intensity and uniformity by use of the laminated rotor construction.

The stator laminations 2 form the generally conventional motor pole pieces 4 and 6 which are separated at the ends of their faces by air gaps 24 and 26, as is customary in motor design in order to minimize the field leakage between the pole pieces. However, the faces of the pole pieces 4 and 6, instead of being circularly disposed about the axes of the shaft 18, as is customary in motor construction, are eccentrically disposed. The pole face of the lower portion 28 of the left hand field pole 4, as viewed in Figure 1, is disposed radially from the center of the rotor shaft a distance greater than the upper portion 30 of the left hand field pole. The pole surface 28—30 lies on an arc drawn from the center of radius 29 displaced from the center of the rotor shaft. The right hand field pole 6, as viewed in Figure 1 is similarly but oppositely formed, the upper portion 32 of the right hand pole, as viewed in Figure 1, being radially disposed a greater distance from the shaft axis than the lower portion 34 of the right hand pole. The pole surface 32—34 lies on an arc drawn from the center of radius 33 which is displaced from the center of the rotor shaft. Center points 29 and 33 are preferably displaced equal and opposite distances from the center of the rotor shaft.

The external surface of the rotor is also eccentrically formed. The rotor, as shown in Figure 1, is positioned with the polar axis 24 lying horizontally, with the north seeking pole to the left and the south seeking pole to the right, and having points on its surface of maximum and equal radius at 42 and 44 and points on its surface of minimum and equal radius at 46 and 48. The rotor surface extending between the points 42 and 48 lies on a semi-circular arc having a center of radius 52 displaced from the center of the rotor shaft 18, and the rotor surface extending between the points 44 and 46 lies on a semi-circular arc having a center of radius 50 displaced from the center of the rotor shaft 18 equally and oppositely from the displacement of the center of radius 50.

When the motor field coil 8 is deenergized, and there is no restraining load upon the rotor shaft 18, the rotor, as a result of its own magnetic effort, will seek a position with respect to the metallic field laminations at which the spacing between the rotor poles and the field is reduced to a minimum. The torque producing this rotation results from the angular direction taken by the magnetic lines of force emanating from the magnetic rotor across the air gap between adjacent rotor and stator surfaces which, as has been described, are both eccentric to the rotor shaft center and are eccentric with respect to each other. Thus the rotor will seek the position shown in construction lines in Figure 1 in which the polar axis 24' is lying between the end portions of the field members designated as 30 and 34 and at which position the distance between rotor polar surfaces 42 and 44 and the stator surface is a minimum.

The eccentric surfaces of the rotor and stator of a motor of the form shown in Figure 1 are disposed in such a manner that their respective eccentricities are, in effect, additive and at the same time a minimum air gap clearance exists between one of the rotor surfaces adjacent to each end of the polar axis and the field surfaces when the rotor is in the position shown in construction lines in Figure 1.

Figure 4:
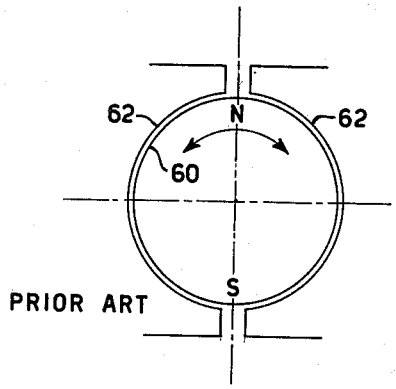
Figure 4 is a diagrammatic showing of a motor having conventional concentric rotor and stator surfaces.

Referring to Figure 4 there is shown for comparison purposes a conventional type of motor having circular and concentric rotor surfaces 60 and field surfaces 62. In this form the motor is neither self-starting nor unidirectional in rotation. The magnetic lines of force between the rotor and the stator are radial in this form of the motor thereby establishing equilibrium conditions which will not give rise to rotor torque. When the motor fields are energized a force equilibrium exists which must be upset by forced rotation of the rotor in either direction before the motor will run.

Figure 5:
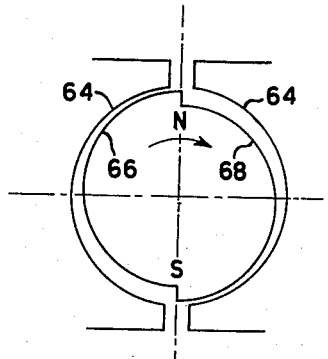
Figure 5 is a diagrammatic showing of a motor having a rotor with eccentric surfaces disposed within stator surfaces concentric with the axis of rotor rotation.

Figure 5 shows a motor having field surfaces 64 concentric with the center of rotor rotation and having rotor surfaces 66 and 68 eccentrically formed with respect to the center of rotor rotation. In this structure the magnetic lines of force between the rotor and the stator surfaces will be radial in direction and thus no torque will exist when the field is deenergized. The only effect of the eccentric rotor structure will be to increase the average air gap dimension in the motor shown in Figure 4.

Figure 6:
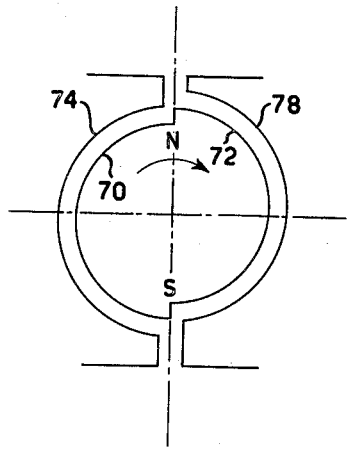
Figure 6 is a diagrammatic showing of a motor having both rotor and stator surfaces eccentric with the axis of rotor rotation and concentric with each other.

Figure 6 shows an electric motor having both rotor surfaces 70 and 72 and stator surfaces 74 and 78 eccentric with the center of rotor rotation. In this form of the machine, however, it will be observed that the rotor has been inverted from the position of the rotor shown in Figure 1. The effect of this inversion is to produce surfaces both of which are eccentric with the center of rotation but which are concentric with each other when the rotor assumes a position as shown in Figure 6, and while eccentricity will exist between rotor and stator surfaces when the rotor is in a position shown in Figure 7, the degree of eccentricity will obviously be much less than the degree of eccentricity between the rotor and stator surfaces in the preferable arrangement shown in Figure 1. Displacing the centers from which the rotor surfaces are drawn from the axis of rotor rotation by a distance different from the distance the stator surfaces centers are displaced will increase the rotor stator eccentricity when the rotor is in the position shown in Figure 7 but will have negligible effect when the rotor is in the position shown in Figure 6.

Figure 7:
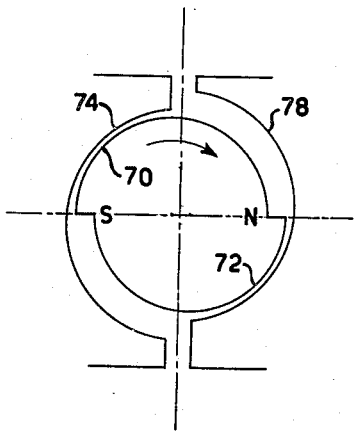
Figure 7 is a diagrammatic showing of the motor of Figure 6 with the rotor in a position displaced 90° from the rotor position shown in Figure 6.

It will be seen that, by arranging the directions of eccentricity of the rotor and stator surfaces so as to be additive and causing a maximum eccentricity between the two surfaces, not only is there produced a motor in which eccentricity exists between the rotor and stator surfaces for all positions of the rotor but there also exists a motor having the same average air gap as the motor shown in Figures 6 and 7 and having greater eccentricity between rotor and stator surfaces during all positions of rotor rotation.

When the rotor has assumed the position shown in construction lines in Figure 1 and the field coils are energized, it will be apparent that the lines of magnetic force crossing the air gap will follow the non-radial path hereinbefore described. Upon energization of the field coil, the rotor will be caused to rotate clockwise in Figure 1 and, in the first half cycle of suitable polarity, the rotor is apparently displaced by rotation to a sufficient degree to bring the polar area of the rotor surface sufficiently over the lower portion of the pole surface 4 so that there exists an appreciable increased air gap at the time of the first half cycle reversal and a comparable reduction in negative torque. Thus the inertia of the rotor is sufficient to cause continued rotor rotation thus providing motor starting and avoiding the occurrence which typically takes place in the type of machine as shown in Figure 4, namely, that upon the reversal of the first half cycle the rotor will be drawn backward and assume a position of equilibrium conditions which do not give rise to rotor torque.

The rotor and stator surfaces shown in Figure 1 are drawn with similar eccentricities, that is, the center points 29, 33, 50 and 52 from which these various surfaces are drawn may be joined by the circle having as a center of radius the center of the shaft axis. While this is not a necessary relation it is a desirable one. When the centers from which the rotor and stator surfaces are drawn are equally displaced from the center of rotor rotation there exists a maximum eccentricity between the rotor and stator surfaces providing a maximum of angular or non-radial displacement of the lines of force across the air gap and, at the same time, there exists an air gap dimension less than that of any other arrangement of centers producing eccentricity of both rotor and stator surfaces and the resulting torque producing non-radial lines of force across the air gap. Accordingly, this embodiment of the present invention provides for a maximum assistance by the permanent magnet force in the form of a forward pull during approximately 175° of the cycle which causes rotation of the rotor while decreasing the air gap from maximum to minimum reluctance.

While the particular structure disclosed herein has been referred to as having rotor and stator surfaces lying on arcs drawn from center of radius points, it will be apparent that involute surfaces may also be employed. However, particularly in small motors, the difference in surface contour between circular or involute form will be negligible. Accordingly, negligible change will be effected thereby upon motor operating characteristics.

It is well known in motor design that it is desirable to reduce the air gap clearances between the stator and the rotor to a minimum and, while it is true that a machine having either or both the rotor and the stator eccentrically formed, as is herein disclosed, will have a greater air gap, hence greater air gap losses, than a machine constructed with concentric field and rotor surfaces. This loss is at least in part compensated for by the fact that apparently the rotor displays the previously mentioned seeking effort even when the machine is running at synchronous speed. Thus while the increase in starting torque provided by the eccentric constructions of the rotor and of the stator is great, the decrease in running torque due to the increased air gap in the eccentric construction is proportionately small.

The highly uniform and increased magnetic field strength produced by the laminated rotor construction increases the efficiency of the motor when it is running under load to a value in excess of what may be obtained with a solid rotor construction and a minimum air gap between concentric field and rotor faces.

It will be observed that, unlike most synchronous machines which run equally well in either direction, this is a unidirectional motor which is self-starting in one direction and will operate at synchronous speed more efficiently in that direction than in the opposite direction. This machine, which is truly a self-starting synchronous machine, is particularly suited to motors of fractional horsepower rating but should not be considered limited to any particular capacity range. The fundamental concepts taught herein are applicable to motors of various sizes.

While the above disclosure sets forth the principles of my invention as applied to a motor, these principles could also be applied in the construction of a magneto-electric generator.

My synchronous motor develops amazingly high efficiencies which are frequently more than double the efficiency of standard fractional horsepower motors now in use. Contrary to the characteristics of the presently employed types of electric motors, in my machine there is no decline in efficiency with reduction in horsepower, but rather, the machine maintains its high degree of efficiency even down to the most minute horsepower model.

It will be obvious that various modifications may be made in the structure disclosed herein without departing from the scope of the invention as set forth in the following claims.

What is claimed is:

1. An alternating current machine comprising a stator, a coil mounted on said stator, opposing pole faces formed by said stator, and a polarized rotor, said rotor being mounted to rotate between said pole faces, the surfaces of said stator pole faces being eccentrically formed with respect to the center of rotor rotation and the surfaces of said rotor lying on either side of the rotor polar axis being eccentrically formed with respect to the center of rotor rotation, the directions of eccentricity of said surfaces being such as to provide a maximum eccentricity between the rotor and stator surfaces.

2. An alternating current machine comprising a stator, a coil mounted on said stator, opposing pole faces formed by said stator, and a polarized rotor, said rotor being mounted to rotate between said pole faces, the surfaces of said stator pole faces being eccentrically formed with respect to the center of rotor rotation and the surfaces of said rotor lying on either side of the rotor polar axis being eccentrically formed with respect to the center of rotor rotation, the directions of eccentricity of said surfaces being such as to provide a uniform eccentricity between the rotor and stator surfaces for all positions of the rotor polar axis.

3. An alternating current machine comprising a stator, a coil mounted on said stator, opposing pole faces formed by said stator, and a laminated permanent magnet rotor, said rotor being mounted to rotate between said pole faces and comprising a stack of permanent magnet elements having their polar axes in parallel arrangement and having abutting adjacent faces, the surfaces of said stator pole faces being eccentrically formed with respect to the center of rotor rotation and the surfaces of said rotor lying on either side of the rotor polar axis being eccentrically formed with respect to the center of rotor rotation, the directions of eccentricity of said surfaces being such as to provide a maximum eccentricity between the rotor and stator surfaces.

4. An alternating current machine comprising a stator, a coil mounted on said stator, opposing pole faces formed by said stator, and a laminated permanent magnet rotor, said rotor being mounted to rotate between said pole faces and comprising a stack of permanent magnet elements having their polar axes in parallel arrangement and having abutting adjacent faces, the surfaces of said stator pole faces being eccentrically formed with respect to the center of rotor rotation and the surfaces of said rotor lying on either side of the rotor polar axis being eccentrically formed with respect to the center of rotor rotation, the directions of eccentricity of said surfaces being such as to provide a uniform eccentricity between the rotor and stator surfaces for all positions of the rotor polar axis.

5. An alternating current machine comprising a stator, a coil mounted on said stator, opposing pole faces formed by said stator, a rotor, said rotor being mounted to rotate between said pole faces, and the surfaces of said pole faces being eccentrically formed with respect to the center of rotor rotation and the surface of said rotor being eccentrically formed with respect to the center of rotor rotation, the directions of eccentricity of said surfaces being such as to provide a maximum eccentricity between the rotor and stator surfaces.

6. An alternating current machine comprising a stator, a coil mounted on said stator, pole faces formed by said stator, and a polarized rotor, said rotor being mounted to rotate between said pole faces, the surfaces of said stator pole faces being eccentrically formed with respect to the center of rotor rotation and the surfaces of said rotor forming polar areas being eccentrically formed with respect to the center of rotor rotation, the directions of eccentricity of said surfaces being such as to provide a maximum eccentricity between the rotor and stator surfaces.

7. An alternating current machine comprising a stator, a coil mounted on said stator, pole faces formed by said stator, and a laminated permanent magnet rotor, said rotor being mounted to rotate between said pole faces and comprising a stack of permanent magnet elements having their polar axes in parallel arrangement and having abutting adjacent faces, the surfaces of said stator pole faces being eccentrically formed with respect to the center of rotor rotation and the surfaces of said rotor forming polar areas being eccentrically formed with respect to the center of rotor rotation, the directions of eccentricity of said surfaces being such as to provide a maximum eccentricity between the rotor and stator surfaces.

FREDERIC J. HAMMES.

REFERENCES CITED

The following references are of record in the file of this patent:

UNITED STATES PATENTS

| Number | Name | Date |
|---|---|---|
| 348,876 | Wightman | Sept. 7, 1886 |
| 830,801 | Mortimer | Sept. 11, 1906 |
| 1,002,718 | Marelli | Sept. 5, 1911 |
| 1,798,571 | Walther | Mar. 31, 1931 |
| 1,980,808 | Leibing | Nov. 13, 1934 |
| 2,131,436 | Howell | Sept. 27, 1938 |
| 2,185,990 | Schurch | Jan. 2, 1940 |

FOREIGN PATENTS

| Number | Country | Date |
|---|---|---|
| 319,905 | Germany | Apr. 3, 1920 |